United States Patent [19]

Rushton

[11] Patent Number: 4,858,366
[45] Date of Patent: Aug. 22, 1989

[54] FISHING ROD HOLDER AND CARRIER

[76] Inventor: Richard T. Rushton, 57 Fairfax Village, Northport, Ala. 35476

[21] Appl. No.: 287,058

[22] Filed: Dec. 21, 1988

[51] Int. Cl.$^4$ .............................................. A01K 97/08
[52] U.S. Cl. .......................................... 43/26; 43/54.1
[58] Field of Search .......... 43/26, 54.1, 57.1; 206/315.1, 315.11; 224/922; 248/525, 534, 535

[56] References Cited

U.S. PATENT DOCUMENTS 3,972,144 8/1976 Geisler ..................................... 43/26
4,170,801 10/1979 Ward ............................... 206/305.11
4,523,704 6/1985 Washington ............................. 43/26

Primary Examiner—M. Jordan
Attorney, Agent, or Firm—Sherman and Shalloway

[57] ABSTRACT

A combined fishing rod holder, carrier and storage apparatus comprising a body of buoyant material having a plurality of parallel tubular conduits extending therethrough each of which is specially formed to accommodate one complete fishing rod and reel combination in a readily accessible manner while offering maximum protection against damage. Removable protective covers for each end, rod retaining means and means for mounting the apparatus to a boat are also provided.

11 Claims, 2 Drawing Sheets

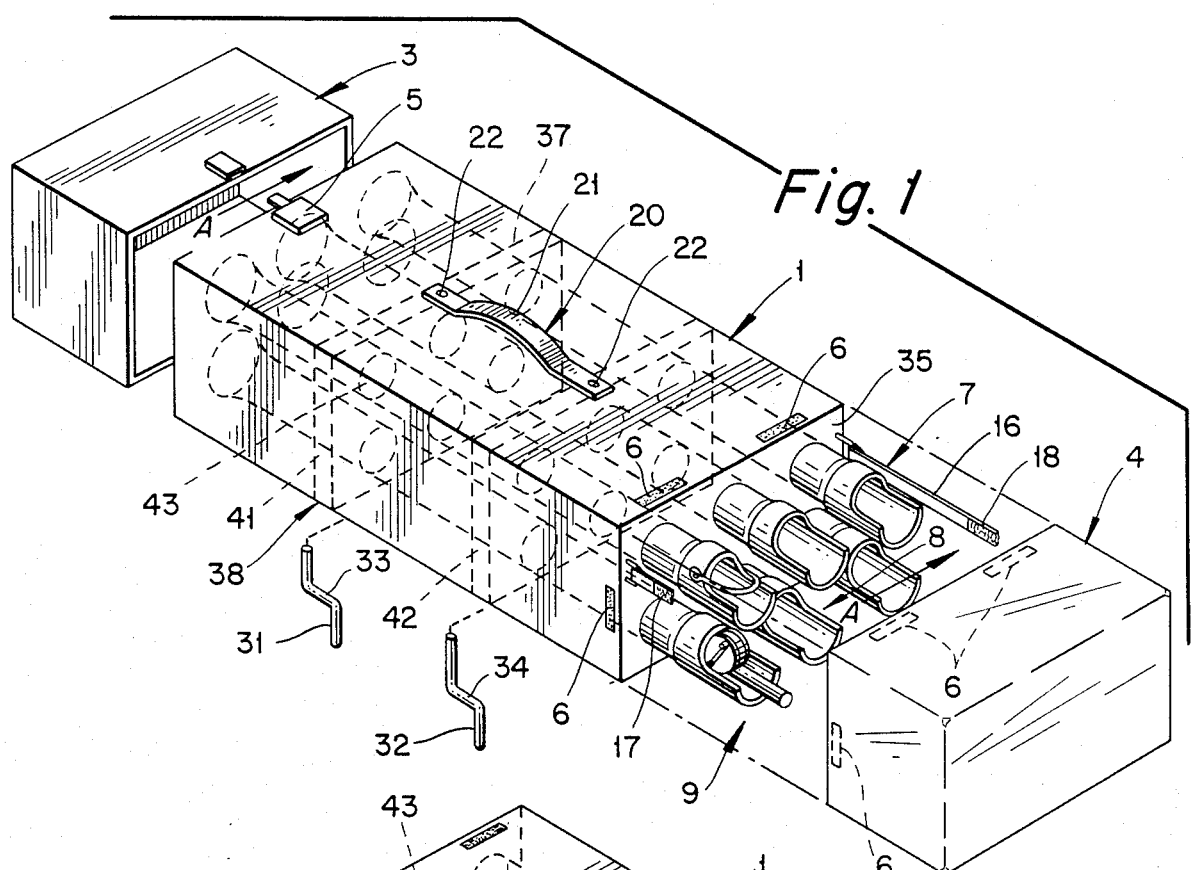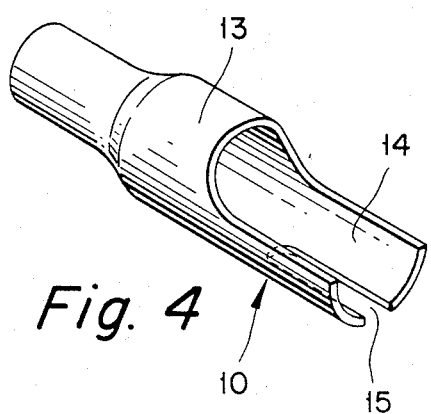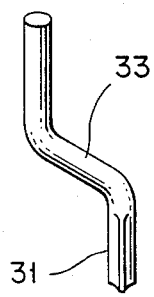

FISHING ROD HOLDER AND CARRIER

BACKGROUND OF THE INVENTION

1. Field Of The Invention

In the sport of fishing, it is not unusual for a fisherman to use more than one rod and reel combination in the course of a day's fishing since different locations require different characteristics of the rod/reel/lure combination. Additionally, there are occasions when the fisherman finds it necessary to make a rapid transition from one rod/reel/lure combination to another. This is particularly important to those who engage in bass fishing tournaments where the allotted time is limited and cannot be wasted attempting to untangle rods, change lures or the like. In such situations, the fisherman will prepare several rods prior to the tournament in anticipation of the conditions to be encountered.

What is needed in the sport is a carrier for these rods that keeps them separate but readily accessible yet offers the maximum protection against loss or damage while being readily transportable from one location to another and mountable on a boat in a convenient position.

2. Description Of The Prior Art

Prior art fishing rod carriers are known; however, they suffer from limitations that the present carrier overcomes. For example, U.S. Pat. No. 4,696,122, to Van Der Zyl, discloses a fishing rod holder/carrier for a plurality of rods that comprises a frame with clip means that engage the rods. Protection for the rods is limited in the form of legs that support the frame on the floor of a boat or camper or the like such that the rod/reel combinations do not contact the floor.

U.S. Pat. No. 4,551,939, to Kitchens, discloses a bass fishing organizer in the nature of a holder that is designed with a plurality of sockets that accommodate rod handles. Although easily removed from or mounted onto a boat, it offers no protection for the fishing equipment.

U.S. Pat. No. 3,406,930, to Seiler, discloses a fishing rod carrier of a multiple tube type within a housing that is securely fastened to the underside of an airplane, while U.S. Pat. No. 4,170,801, to Ward, discloses a clam-shell case with rod holding clips that is adapted to be mounted inside a boat below the level of the gunwale. In both cases the rods are not readily accessible from the position of a fishing chair.

Other known carriers, while offering more in the way of protection and portability, fail in terms of easy ready access or mounting means for proper positioning on a boat. Thus, U.S. Pat. No. 2,749,645, to McKern, discloses a container for a collapsed rod, while U.S. Pat. Nos. 3,131,503, to Gottula and Pat. No. 3,624,948, to DeBaker, Sr., accommodate only one rod each with no cover provision for the handle and reel. U.S. Pat. No. 3,674,190, to Wright, discloses a carrier for a plurality of rods with reels attached including cover means for both ends but offers no means for mounting on a boat so as to afford easy access while fishing; furthermore, the structure does not readily lend itself to such mounting. Finally, U.S. Pat. No. 3,678,611, to Files, although buoyant, will not accommodate a plurality of fully assembled rods.

SUMMARY OF THE INVENTION

Accordingly, this invention provides a carrier for one or more fishing rods with reels attached that is readily transported and offers protection for the rods while in use or in storage and easy access to them by a fisherman. The carrier comprises a body of buoyant material having a plurality of parallel, elongate, smooth bore tubular conduits extending therethrough each of which is specially formed to accommodate one complete fishing rod and reel combination in an upright, readily accessible manner while offering maximum protection against breakage. Removable protective covers for each end of the body, rod retaining means and means for mounting the body to a boat are also provided.

BRIEF DESCRIPTION OF THE DRAWING FIGURES

FIG. 1 is a forward perspective view of one embodiment of the carrier showing the forward ends of the individual rod holders.

FIG. 2 is a rearward perspective view of the embodiment of the carrier shown in FIG. 1 illustrating the rear ends of the individual rod holders.

FIG. 4 is an enlarged perspective view showing detail of the forward rod handle/reel accommodating cup of the rod holders.

FIG. 5 is an enlarged view showing detail of the offset mounting pins.

DETAILED DESCRIPTION OF THE INVENTION

Figure 3:
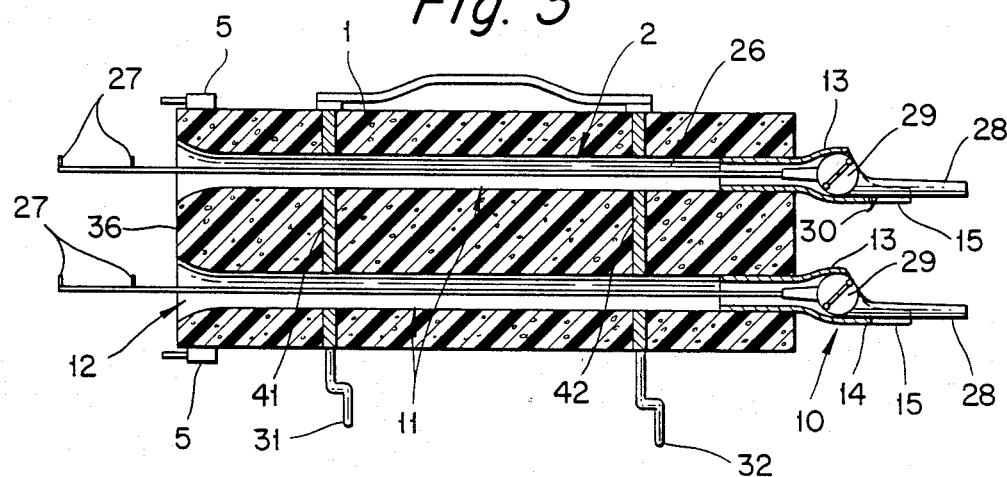
FIG. 3 is a longitudinal cross section taken along line A—A of FIG. 1.

Referring now to the drawings wherein like reference numerals designate identical parts, FIG. 1 illustrates a preferred embodiment of a buoyant fishing rod carrier constructed in accordance with this invention. The carrier comprises a substantially solid body 1 of rigid buoyant foam such as polystyrene, polyurethane or the like, the buoyancy being sufficient to support both the carrier and its contents, molded around a plurality of orderly arranged rod holding tubes 2. A rigid tip end cover 3 and a flexible fabric handle end cover 4 complete the overall assembly. Separable fastening means are provided for the covers 3 and 4 and may be a clip or latch means 5 for the rigid cover 3 and loop and pile, or Velcro ®, 6 for the soft cover 4. Alternatively a hard cover with appropriate fastening means may be used in place of the soft cover. In either case, the covers are shells of a size and shape corresponding to that of the body 1 so as to enclose the projecting ends of fishing rods.

The rod holding tubes 2 are preferably arranged in parallel rows 8 and 9 within the foam body by means of support frames 41 and 42, although with a body material of sufficient strength the frames would not be necessary. In such a case the tubes may be held in a jig while the body 1 is molded around them. These frames 41 and 42 are provided with apertures 43 through which the tubes 2 pass and by which they are held in position while the buoyant foam body 1 is formed around both the tubes 2 and the frames 41 and 42. Associated with each row is a rod securing means in the form of a strap 7 that extends across the handle/reel accommodating cups 10 of the tubes 2 behind the body of a reel 29, as shown in the lower row of tubes 9, to hold the rods in place for security. This securing strap 7 may be a two piece arrangement comprising a long portion 16 and a short portion 17 each secured to opposite sides of the forward end face 35 of the foam body 1. A fastening means for securing the ends of portions 16 and 17 together is provided and is preferably in the nature of hook and pile, or Velcro ®, material 18. Alternatively, buckles may be used in which case they should be of a rust proof material. As an alternative to the two piece strap, a single elastic band may be used, the ends thereof being secured to the foam body 1 similar to the two piece strap portions 16 and 17. In this embodiment the strap is stretched over the reels 29 to hold the rods 26 in place in their respective tubes 2. A further alternative is to provide each handle/reel accommodating cup 10 with an individual elastic reel holding strap 19 which may be stretched around the reel 29 to securely hold the fishing rod 26 in the tube 2. The ends of the elastic strap 19 are fastened to opposite sides of the handle/reel cup 10.

The rod holding tubes 2 are specially formed so as to hold fishing rods in an upright manner ready to be grasped by the handle and withdrawn therefrom without resulting in any damage to the rods. FIG. 3 illustrates a fishing rod 26 in position in a holding tube 2 within the foam body 1. Each holding tube comprises the aforementioned handle/reel accommodating cup 10, a central tubular portion 11 of constant diameter, and a flared end 12 and has a smooth inner surface. The flared ends 12 are preferably flush with the rearward end face 36 of the foam body 1, as shown in FIGS. 2 and 3, and serve to eliminate rod damage which might result from the line guides 27 of the rod 26 catching on an otherwise straight edge when the rod is withdrawn. Projecting beyond the forward end face 35 of the foam body 1, the handle/reel cup 10 forms the other end of each tube 2 and comprises an enlarged portion 13 that is of sufficient size to at least partially accommodate that portion of the rod handle 28 to which the reel 29 is attached. The upper part of this enlarged portion 13 is removed leaving a lower portion 14 that extends beyond the cup 10 and continues partway under the rod handle 28. Cut into the end of this portion 14 at the bottom most level of the curve of the tube and extending longitudinally toward the cup 10 is a slot 15 that is of sufficient width and length to permit entry of the trigger-like finger support 30 that depends from the underside of the rod handle 28. The relationship of this slot 15 and finger support 30 serve to keep the rod 26 upright in the tube 2 so that it is easy to grasp and withdraw.

Returning to FIG. 1, it is seen that the carrier is provided with a handle 20 attached to the support frames 41 and 42 through the upper surface 37 of foam body 1 for easy transportation. This handle 20 is preferably of a retractable strap type wherein the handle body 21 is secured by means of ferrules 22 and 23 in a manner that allows the handle body 21 to be raised for carrying then retracted flat against the upper surface 37 when not in use. Preferably the handle 20 is positioned on the foam body 1 so that when carried, the carrier is most nearly balanced. Alternatively, when the buoyant body 1 is formed from a material having the proper characteristics, such as a rigid skin on all outer surfaces, the handle may be molded directly into the structure of the foam body 1.

Figure 7:
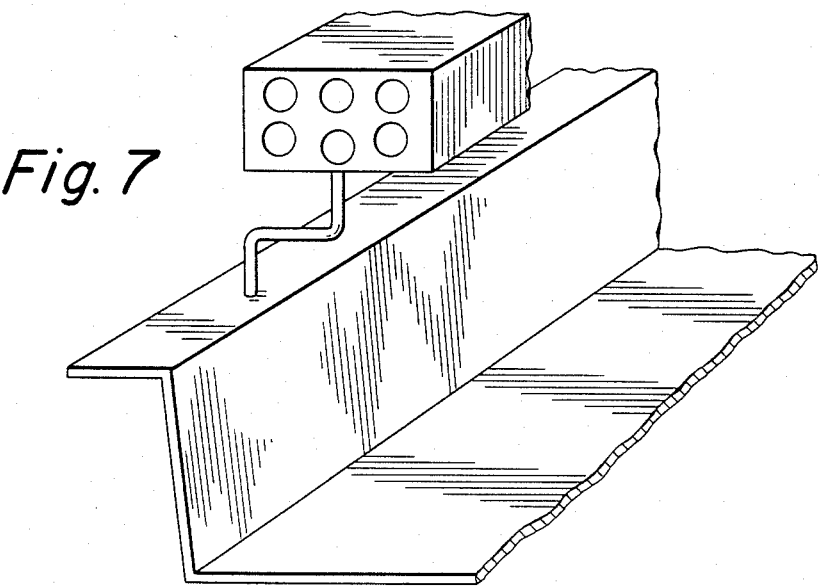
FIG. 7 is a perspective view that shows the mounting relationship afforded by the offset mounting pins.

On the lower surface 38 of the foam body 1 are support pins 31 and 32 which like the handle 20 are ultimately secured to frames 41 and 42 along the longitudinal center line of the carrier. Alternatively, as with the tubes, where the body material is of sufficient strength the pins may be molded into place. These pins 31 and 32 fit into corresponding sockets formed in the gunwale of a boat or into separate brackets that may be attached to the gunwale similar to the manner in which oar locks are normally secured to a row boat. As shown in the drawings, these pins 31 and 32 are formed with offsets 33, 34 such that when the carrier is mounted to the boat, the body of the carrier is supported inboard of the gunwale as shown in FIG. 7. Without this offset part of the carrier would hang outboard of the gunwale and would be subject to catching on docks, vegetation or other boats. The rotational positions of the pins 31 and 32 are selectable so that the offsets 33, 34 may be to the left or right of the center line of the carrier. This allows the carrier to be mounted on either side of the boat yet still be inboard of the gunwale as intended, thus accommodating left and right handed persons.

Figure 6:
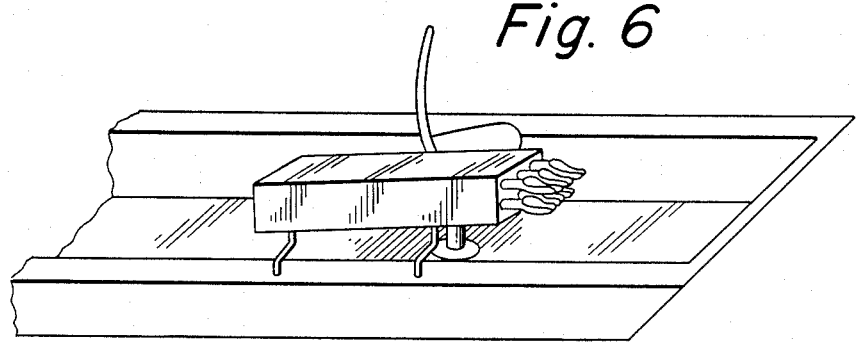
FIG. 6 is a perspective view that illustrates the relationship of the mounted carrier to a fishing chair in a boat.

It is preferred that the forward mounting pin 32, that is the pin towards the reel/handle end of the carrier, be longer than the rearward pin 31 so that when the carrier is on the boat, the forward end is raised as shown in FIG. 6. This not only places the rod handles closer to the fisherman but also reduces any tendency for the rods to fall out and assists in drainage of water from the tubes 2.

Although illustrated with six tubes and thus accommodating six rod/reel/lure combinations, it is not the inventor's intention to limit the carrier to any particular number or arrangement of tubes. Six has been found to be the optimum number of rods and reels employed by most fishermen generally and by bass fisherman in particular. Additionally, it has been found that the illustrated arrangement is the most comfortable in terms of use and carryability. Other arrangements of the tubes and cross sectional shapes of the body such as diamond shape or circular arrangement are considered to be within the scope of this invention. Furthermore, no specific dimensions are intended other than what would be minimally required to provide adequate support and protection for the variety of rods and reels employed. Generally a length of 3 to 5 feet for the foam body 1 and diameters of 1½ to 3 inches for the tubes with adequate enlargement of the forward handle/reel cups 10 to accommodate the reels would be sufficient for most bass fishing requirements. However, the structure could be made larger or smaller to allow its use with other fishing equipment such as deep sea rigs. Preferably, the overall length of the body should be sufficient to accommodate at least half the length of a fishing rod.

Furthermore, although the preferred embodiment is as disclosed above with each fisherman having his own carrier, an additional embodiment comprises a double carrier that would be shared by fishermen in the bow and stern seats of a boat. In this embodiment, rows of bow and stern facing tubes are arranged in the foam body in an alternating arrangement both vertically and horizontally. Such a construction would not permit one mounting pin to be longer than the other so the necessary upward angle to achieve drainage is provided by the tubes themselves being positioned in the foam body with the handle/reel cup end higher than the flared end. With this embodiment it would be especially preferred to have rigid covers for each end of the foam body to provide protection for any extending rod tips.

Additionally, although the above described preferred embodiment comprises a buoyant foam body molded around separate rod holding tubes, an alternative construction would be to replace the individual tubes with smooth bores molded or drilled through the foam body. The handle/reel accommodating cups may be separate pieces added to or molded into the forward end face of the body and, as noted above, the carrying handle may be molded directly into the appropriate surface as an integral part thereof.

Although this invention has been described with a certain degree of particularity, it is understood that the present disclosure is made only by way of example and that numerous changes in the details of construction and the combination and arrangement of parts may be resorted to without departing from the spirit and the scope of the invention.

What is claimed is:

1. An apparatus for holding, carrying and storing a plurality of fishing rod and reel combinations comprising, a body of buoyant material, a plurality of parallel, elongate, smooth bore, tubular conduits disposed within and extending through said body, cover means attachable to each end of said body over the ends of said conduits, means for mounting said body on a boat, and means for retaining a fishing rod within at least one of said conduits.

2. The apparatus of claim 1 wherein said body of buoyant material has a regular shaped cross section, said conduits being arranged in a corresponding pattern therewithin, said body having an upper and lower surface, a carrying handle being provided on said upper surface and said mounting means being located on said lower surface.

3. The apparatus of claim 2 wherein said conduits have forward and rearward ends, said forward ends extend beyond one end surface of said body and are each formed into a shape to accommodate a handle and reel of a fishing rod inserted into said conduit and each of said rearward ends is outwardly flared.

4. The apparatus of claim 3 wherein said shape of said forward end of each of said conduits comprises a cup of enlarged diameter relative to the diameter of the body of said conduit, this enlarged diameter being sufficient to at least partially encompass a handle and reel of a fishing rod inserted into said tube, said cup having a lower portion extending beyond said cup for supporting said fishing rod handle.

5. The apparatus of claim 4 wherein said lower extending support portion of said cup has a slot cut in the outer end thereof at the bottom most level of the curve of the tube and running longitudinally along the axis of said portion for a distance partway between the end of said portion and said cup.

6. The apparatus of claim 3 wherein said fishing rod retaining means is attached to the end face of said body from which said forward ends of said conduits project and comprises a strap means adapted to pass from one side of said end face to the other behind the reels mounted on fishing rods housed within said conduits.

7. The apparatus of claim 3 wherein said fishing rod retaining means is attached to the end face of said body from which said forward ends of said conduits project and comprises an elastic strap that is stretchable over reels attached to fishing rods housed within said conduits.

8. The apparatus of claim 3 wherein said cover means attachable to each end of said body over the ends of said conduits comprise a rigid shell corresponding in shape and size to said body and attachable to the rearward end of said body to provide protection for fragile rod tips and a flexible cover attachable to the forward end of said body over said forward ends of said conduits.

9. The apparatus of claim 3 wherein said cover means attachable to each end of said body over the ends of said conduits comprise rigid shells corresponding in shape and size to said body and attachable to said body over projecting conduit ends and fishing rods by appropriate fastening means.

10. The apparatus of claim 2 wherein said mounting means comprises first and second rotatable elongate pins attached to the lower surface of said body along the longitudinal center line thereof, said first pin being disposed toward the forward end of said body and said second pin being disposed toward the rearward end of said body, said pins designed to fit in sockets installed in the gunwale of a boat and having an offset between the socket engaging portion and said body such that said body, when in position on a boat, will not extend over the outboard side thereof, said first pin being longer than said second pin such that said forward end of said body is at a higher elevation than said rearward end.

11. An apparatus for holding and carrying a plurality of fishing rod and reel combinations comprising a body of buoyant material having a rectangular cross sectional shape and being molded about a plurality of elongate tubes, said tubes being arranged in parallel in a rectangular pattern and adapted to accept and hold one complete fishing rod and reel combination per tube, the forward ends of said tubes extending from one end of said buoyant body and being formed to provide support for the handle and reel portion of a fishing rod, the rearward ends of said tubes being of flared shape and flush with the opposite end of said buoyant body to provide a smooth withdrawing surface for fishing rod tips, and the interior of said tubes being of continuous diameter and smooth surface, said apparatus further comprising covers attachable to each end of said body to fully enclose and protect fishing rods carried therein, at least one of said covers being rigid and attachable to the rearward end of said body over the tips of the fishing rods, handle means to facilitate carrying said apparatus and mounting means for attaching the apparatus to a boat when said apparatus is mounted thereon, said mounting means comprising pins extending from the underside of said body to engage sockets on a boat, said pins having an offset such that said body does not extend over the outboard edge of the boat, said apparatus further comprising individual rod securing means associated with the forward end of each of said tubes whereby fishing rods may be retained within said tubes when said covers are removed.

* * * * *